O. C. WHITE.
DENTISTS' CHAIRS.
Reissued July 4, 1876.
No. 7,215.
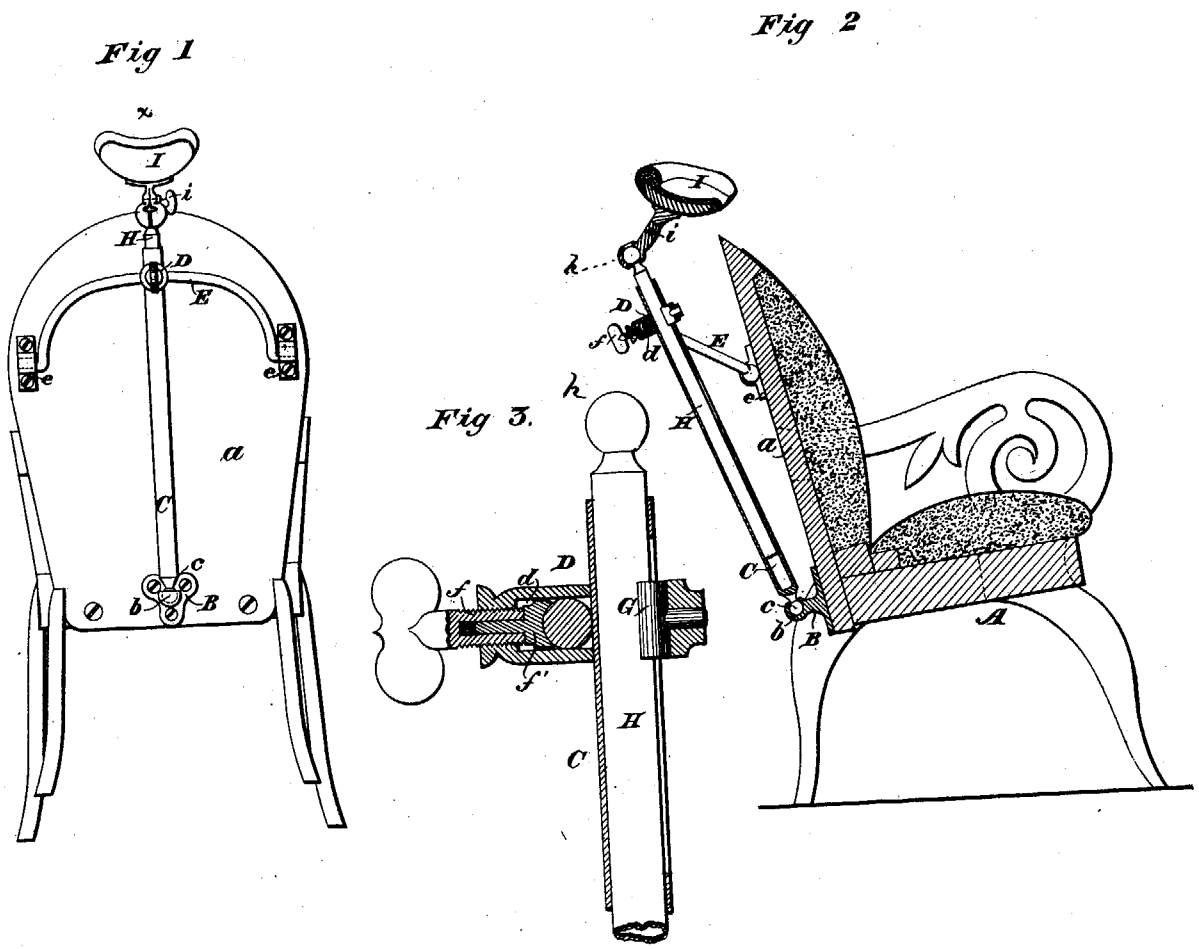
WITNESSES
Wm A Skinkle
F. Stick
INVENTOR
Otis C White
By his Attorney
Wm D. Baldwin
N. PETERS, PHOTO-LITHOGRAPHER, WASHINGTON, D. C.

UNITED STATES PATENT OFFICE.

OTIS C. WHITE, OF HOPKINTON, MASSACHUSETTS.

IMPROVEMENT IN DENTISTS' CHAIRS.

Specification forming part of Letters Patent No. 62,794, dated March 12, 1867; reissue No. 7,215, dated July 4, 1876; application filed March 21, 1876.

*To all whom it may concern:*

Be it known that I, OTIS C. WHITE, of Hopkinton, in the county of Middlesex and State of Massachusetts, have invented certain new and useful Improvements in Dentists' Chairs, of which the following is a specification:

My invention has particular reference to chairs for the use of dentists, barbers, and photographers, but may be used either in whole or in part for various other useful purposes.

The object of my invention is to render a head-rest adjustable vertically, laterally, and longitudinally, thus imparting to it a wide range of movement.

The subject-matter claimed hereinafter will be specifically designated.

In the accompanying drawings, Figure 1 represents a back view of a chair with my improvements attached thereto; Fig. 2, a vertical longitudinal section therethrough on the line *x x* of Fig. 1; and Fig. 3 is a detail view of the clamp detached, and on an enlarged scale.

In such drawings, a chair, A, is shown as having a back, *a*, upon which a head-rest and its appurtenances are secured. An arm or bracket, B, secured upon the lower part of the back of the chair, is provided with a socket or step, *b*, for the reception of a pivot or ball joint, *c*, on the lower end of a tubular rod, C. A clamp, D, slides freely up and down on this rod C, and is also provided with a lateral opening, *d*, in it.

A bail or semi-elliptical curved rod, E, swings in bearings *e* on the back of the chair, and passes through the eye or opening *d* of the clamp above mentioned. The inner side of the bail within the clamp rests against the back of the tubular rod C, and is pressed into contact therewith by means of a screw, *f*, which passes through the clamp, and bears on a saddle, *f'*, resting against the bail. A similar saddle, G, is placed on the opposite or rear side of the clamp, being provided with a journal or spindle to enter the clamp, so as to render the saddle capable of revolving within the clamp. This saddle extends into a longitudinal slot in the tubular rod C, and rests against a rod, H, extending into, projecting from, and movable endwise in, the tubular rod C.

A head-rest, I, is mounted on a longitudinally slotted or split arm, through which a set-screw, *i*, passes, and carries at its lower end a ball-and-socket clamp, fitting over a head, *h*, on the upper part of the rod H. The set-screw *i*, arranged in the clamp, serves to contract the jaws upon the head.

The rod H might be dispensed with, and the head-rest applied directly to the tubular rod C, in the same manner in which it is connected with the head *h*; but this would materially limit the upward and downward movements of such head-rest.

From the foregoing description, it will be perceived that the head-rest can be swung longitudinally, or toward or from the back of the chair; can be moved laterally relatively thereto; and can also be raised or lowered, thus giving the widest range of motion to it.

The clamp D, as constructed, it will be observed, operates not only to clamp the rod C to the bail, but also clamps the bail, the rod C, and the rod H together, preventing the latter not only from turning, but from moving endwise as well.

What I claim as my invention is—

1. A head-rest adjustable vertically, laterally, and longitudinally on its support relatively to the back of the chair, substantially as hereinbefore set forth.

2. The combination, substantially as hereinbefore set forth, of a head-rest, its slotted supporting-clamp, and a set-screw passing through the slotted clamp, whereby the head-rest may be adjusted and held in any desired position upon its support.

3. The combination, substantially as hereinbefore set forth, of an adjustable supporting-bar and an adjustable head-rest connected therewith by a universal clamp-joint.

4. The combination, substantially as hereinbefore set forth, of the head-rest, universal clamp-joint, and a vertically and laterally adjustable supporting rod or bar mounted upon the chair.

5. The combination, substantially as hereinbefore set forth, of an adjustable head-rest, a supporting-bar united with it by a universal clamp-joint, and a second clamp, through which the supporting-bar moves endwise.

6. The combination, in a head-rest, substantially as hereinbefore set forth, of a supporting-rod, a bail, a clamp through which both the rod and bail pass, and a single clamp-screw which locks the parts together.

OTIS C. WHITE.

Witnesses:

A. EVARTS CLAFLIN,

CLEMENT MESERVE.